United States Patent
Masztalski et al.

(10) Patent No.: US 12,374,348 B2
(45) Date of Patent: Jul. 29, 2025

(54) METHOD AND ELECTRONIC DEVICE FOR IMPROVING AUDIO QUALITY

(71) Applicant: SAMSUNG ELECTRONICS CO., LTD., Suwon-si (KR)

(72) Inventors: Piotr Masztalski, Warsaw (PL); Krzysztof Arendt, Warsaw (PL); Mateusz Matuszewski, Warsaw (PL); Jakub Tkaczuk, Warsaw (PL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 395 days.

(21) Appl. No.: 17/869,501

(22) Filed: Jul. 20, 2022

(65) Prior Publication Data

US 2023/0024855 A1    Jan. 26, 2023

Related U.S. Application Data

(63) Continuation of application No. PCT/KR2022/010281, filed on Jul. 14, 2022.

(30) Foreign Application Priority Data

Jul. 20, 2021   (KR) .................. 10-2021-0095161

(51) Int. Cl.
  *G10L 21/0216*   (2013.01)
  *G10L 25/60*   (2013.01)
  *G10L 25/93*   (2013.01)

(52) U.S. Cl.
  CPC .......... *G10L 21/0216* (2013.01); *G10L 25/60* (2013.01); *G10L 25/93* (2013.01)

(58) Field of Classification Search
  CPC ..... G10L 21/0216; G10L 25/60; G10L 25/93; G10L 17/02; G10L 2021/02082
  (Continued)

(56) References Cited

U.S. PATENT DOCUMENTS 7,483,831 B2   1/2009   Rankovic
7,895,038 B2   2/2011   Nishimura et al.
(Continued)

FOREIGN PATENT DOCUMENTS

CA    2 491 688 C      9/2013
KR    10-2006-0039436 A    5/2006
(Continued)

OTHER PUBLICATIONS

International Search Report (PCT/ISA/210) dated Oct. 11, 2022 issued by the International Searching Authority in International Application No. PCT/KR2022/010281.
(Continued)

*Primary Examiner* — Davetta W Goins
*Assistant Examiner* — Fouzia Hye Solaiman
(74) *Attorney, Agent, or Firm* — Sughrue Mion, PLLC

(57) ABSTRACT

An electronic device for improving a quality of an audio includes: a microphone configured to obtain an audio input including a voice; at least one memory; and at least one processor. The at least one processor is configured to execute one or more instructions stored in the memory to: obtain a first voice fingerprint corresponding to the obtained audio input; obtain a second voice fingerprint corresponding to the voice; estimate, based on the first voice fingerprint and the second voice fingerprint, noise caused by an acoustic environment of the obtained audio input; and remove the estimated noise from the obtained audio input.

16 Claims, 10 Drawing Sheets

(58) Field of Classification Search
USPC .......................................................... 704/200
See application file for complete search history.

(56) References Cited

U.S. PATENT DOCUMENTS

| | | | |
|---|---|---|---|
| 8,639,516 | B2 | 1/2014 | Lindahl et al. |
| 8,831,936 | B2 | 9/2014 | Toman et al. |
| 9,218,820 | B2* | 12/2015 | Kruglick ............. H04L 65/1083 |
| 9,899,036 | B2 | 2/2018 | Bilobrov |
| 10,178,474 | B2 | 1/2019 | Klimanis |
| 10,614,827 | B1* | 4/2020 | Korjani ............... G10L 21/0364 |
| 10,692,510 | B2* | 6/2020 | Fischer ............... G10L 21/0224 |
| 11,475,907 | B2 | 10/2022 | Chen |
| 2006/0161777 | A1* | 7/2006 | Kalker .................. G10L 19/018 |
| | | | 704/E19.009 |
| 2006/0222184 | A1* | 10/2006 | Buck ...................... H04R 3/005 |
| | | | 381/71.1 |
| 2009/0132259 | A1 | 5/2009 | Kraemer |
| 2010/0121634 | A1 | 5/2010 | Muesch |
| 2014/0270194 | A1 | 9/2014 | Des Jardins |
| 2016/0198030 | A1 | 7/2016 | Kim |
| 2020/0327887 | A1 | 10/2020 | Malik et al. |
| 2021/0326421 | A1* | 10/2021 | Khoury ................... G10L 17/08 |

FOREIGN PATENT DOCUMENTS

| | | |
|---|---|---|
| KR | 10-1521478 B1 | 5/2015 |
| KR | 10-2020-0061258 A | 6/2020 |
| WO | 2017/050972 A1 | 3/2017 |
| WO | WO-2020103703 A1 * | 5/2020 ............ G06F 3/167 |

OTHER PUBLICATIONS

Chen, Zhen et al., "An audio watermark-based speech bandwith extension method", EURASIP Journal on Audio, Speech, and Music Processing, Jan. 10, 2013, pp. 1-8.

Chuang, Fu-Kai et al., "Speaker-aware Deep Denoising Autoencoder with Embedded Speaker Identity for Speech Enhancement", INTERSPEECH 2019, Sep. 15, 2019, pp. 3173-3177.

Lee, Joohyung et al., "Dynamic Noise Embedding: Noise Aware Training and Adaptation for Speech Enhancement", APSIPA Annual Summit and Conference 2020, Aug. 27, 2020 pp. 739-746.

Ernst, Ori et al., "Speech Dereverberation Using Fully Convolutional Networks", 2018 26th European Signal Processing Conference (EUSIPCO), Sep. 3, 2018, pp. 395-399.

Anonymous, "Explore noise reduction with Adobe Audition", ADOBE, 2022, https://www.adobe.com/products/audition/noise-reduction.html.

LiveBird Technologies Private Limited, "Voice Recorder Lite: Record HD", Apple, 2022, https://apps.apple.com/au/app/voice-recorder-lite-record-hd/id955000203.

Anonymous, "Sound clear in online meetings", KRISP, 2022, https://krisp.ai/. (9 pages total).

Anonymous, "Noise Reduction and Echo Cancellation", SoliCall, 2022, https://solicall.com/. (6 pages total).

* cited by examiner

METHOD AND ELECTRONIC DEVICE FOR IMPROVING AUDIO QUALITY

CROSS-REFERENCE TO THE RELATED APPLICATION(S)

This application is a bypass continuation application of International Application No. PCT/KR2022/010281, filed on Jul. 14, 2022, in the Korean Intellectual Property Receiving Office, which claims priority to Korean Patent Application No. 10-2021-0095161, filed on Jul. 20, 2021, the disclosures of which are incorporated by reference herein in their entireties.

BACKGROUND

1. Field

The disclosure relates to a method and an electronic device for improving audio quality.

2. Description of the Related Art

Recently, research has been actively conducted on technology using speech recognition. Natural language processing (NLP) for analyzing a voice and using the analyzed voice to control devices is receiving considerable attention, and as technology has advanced, deep learning techniques are being used beyond statistical NLP and machine learning techniques utilizing corpus data.

In the related art, there is a problem in that the performance of speech recognition technology is degraded due to the influence of an acoustic environment in which a voice is propagated. For example, when there is reverberation or echo in a space where a voice is propagated, or a sound other than a speaker's voice is present, the performance of speech recognition may be degraded due to such noise.

SUMMARY

According to an embodiment of the disclosure, provided is a method of improving a quality of an audio, the method including: obtaining an audio input including a voice; obtaining a first voice fingerprint corresponding to the obtained audio input; obtaining a second voice fingerprint corresponding to the voice; estimating, based on the first and second voice fingerprints, noise caused by an acoustic environment of the obtained audio input; and removing the estimated noise from the obtained audio input.

According to an embodiment of the disclosure, provided is a non-transitory computer-readable recording medium has recorded thereon a program to be executed on at least one processor to cause the at least one processor to perform: obtaining an audio input including a voice; obtaining a first voice fingerprint corresponding to the obtained audio input; obtaining a second voice fingerprint corresponding to the voice; estimating, based on the first and second voice fingerprints, noise caused by an acoustic environment of the obtained audio input; and removing the estimated noise from the obtained audio input.

According to an embodiment of the disclosure, provided is an electronic device for improving a quality of an audio, the electronic device including: a microphone configured to obtain an audio input including a voice; at least one memory configured to store one or more instructions; and at least one processor configured to execute the one or more instructions to: obtain a first voice fingerprint corresponding to the obtained audio input; obtain a second voice fingerprint corresponding to the voice; estimate, based on the first and second voice fingerprints, noise caused by an acoustic environment of the obtained audio input; and remove the estimated noise from the obtained audio input.

BRIEF DESCRIPTION OF DRAWINGS

The above and other aspects, features, and advantages of certain example embodiments of the disclosure will be more apparent from the following description taken in conjunction with the accompanying drawings, in which.

DETAILED DESCRIPTION

Figure 1:
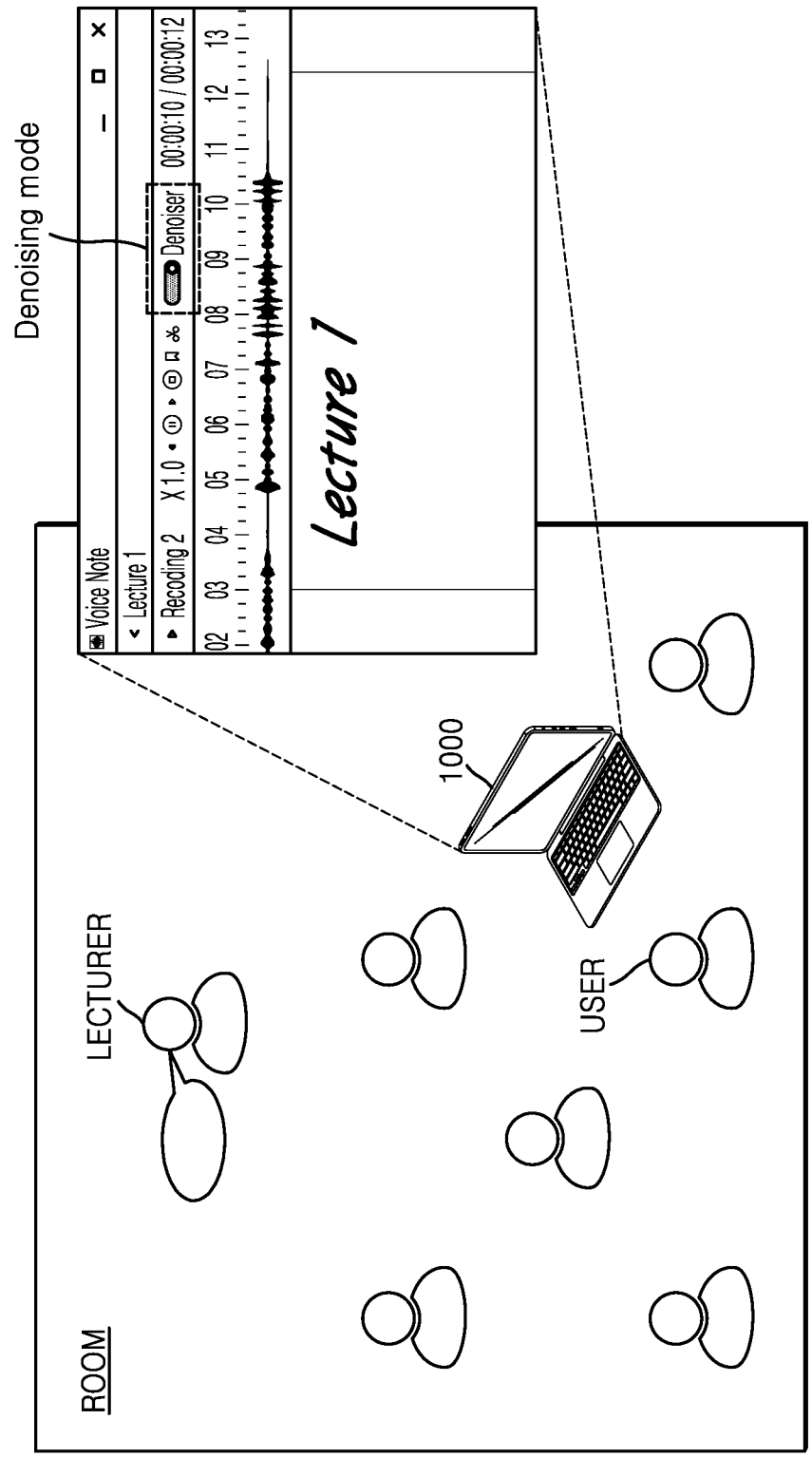
FIG. 1 is a diagram for describing an operation of an electronic device obtaining an audio input including a voice in an acoustic environment, according to an embodiment of the disclosure.

Throughout the disclosure, the expression "at least one of a, b or c" indicates only a, only b, only c, both a and b, both a and c, both b and c, all of a, b, and c, or variations thereof.

Embodiments of the disclosure will now be described more fully hereinafter with reference to the accompanying drawings so that they may be easily implemented by one of ordinary skill in the art to which the disclosure belongs. However, the disclosure may have different forms and should not be construed as being limited to the embodiments of the disclosure set forth herein.

Throughout the specification, when a part "includes" or "comprises" an element, unless there is a particular description contrary thereto, the part may further include other elements, not excluding the other elements. Furthermore, terms, such as "portion," "module," etc., used herein refer to a unit for processing at least one function or operation and may be implemented using hardware or software or a combination of hardware and software.

Although the terms including an ordinal number such as "first", "second", etc. may be used herein to describe various elements or components, these elements or components should not be limited by the terms. The terms are only used to distinguish one element or component from another element or component.

One or more example embodiments provide a method and an electronic device for improving audio quality by using voice fingerprint pairs.

The present embodiments of the disclosure relate to a method and an electronic device for improving audio quality, and detailed descriptions of matters which are widely known to one of ordinary skill in the art to which the following embodiments of the disclosure belong will be omitted.

In the disclosure, an 'electronic device' may be a mobile device such as a smartphone or a portable computing device, or a wearable device such as a smartwatch or a smart band. The electronic device may be a user terminal capable of executing an application that obtains audio as an input, such as a recording application, a video recording application, a teleconference application, a voice assistant application, etc. Alternatively, the electronic device may be a home appliance such as a home assistant that recognizes a voice, an artificial intelligence (AI) speaker, a TV, an air conditioner, a robot vacuum cleaner, etc.

In the disclosure, an 'audio input' refers to an input of an utterance including a voice. For example, in a situation where there is a speaker and a listener, the listener may operate an electronic device to obtain, as an audio input, a voice generated by a verbal act in which the speaker speaks by uttering sounds. In this case, an audio input containing noise as well as a voice uttered by the speaker may be input to the electronic device. When the speaker is far from the listener, a far-field voice may be obtained as an audio input to the listener's electronic device after propagating in a space where the speaker and listener are located.

In the disclosure, a 'voice fingerprint' represents unique feature information included in a voice. The voice fingerprint represents a degree of variability to which various types of information that may be used to identify a speaker's voice are distributed in the voice. The voice fingerprint may be represented as various types of feature vectors. The voice fingerprint may be obtained not only from a speaker's entire voice but also from an audio segment corresponding to a part of the speaker's entire voice. Even when voices have different lengths and different contents, a fingerprint may be obtained from each voice to identify a speaker who utters the corresponding voice. In addition, because each speaker's voice has a voice fingerprint that is distinguishable from that of another speaker's voice, even when voices of multiple speakers are included in the audio input, each speaker may be recognized using a voice fingerprint obtainable from a corresponding voice.

FIG. 1 is a diagram for describing an operation of an electronic device 1000 obtaining an audio input including a voice in an acoustic environment, according to an embodiment of the disclosure.

In FIG. 1, for convenience of explanation, it is assumed that a recording application having a denoising function is installed on the electronic device 1000, but embodiments of the disclosure are not limited thereto. Referring to FIG. 1, a lecturer corresponds to a speaker, and a user who listens to a lecture corresponds to a listener. FIG. 1 illustrates a case in which a user executes the recording application installed on the electronic device 1000 and activates a denoising mode to record the lecture. The electronic device 1000 may obtain an audio input containing a lecturer's voice.

As shown in FIG. 1, even when a user using the electronic device 1000 for recording the lecture and the lecturer are in an indoor space, the lecturer's voice is propagated in the indoor space in the form of acoustic waves, and thus, sound quality and intelligibility may be degraded. In other words, the electronic device 1000 may obtain, as an audio input, a voice in which the influence of an acoustic environment is reflected or which contains other noise as well. A recording may contain ambient noise and user-caused noise (e.g., keyboard typing, clicking, coughing, etc.) A denoised version of recording may contain a lecturer's voice louder and clearer than that in the original recording.

In FIG. 1, it is assumed that the speaker and the listener are in the same indoor space, but embodiments of the disclosure are not limited to a case in which an acoustic environment is an indoor environment. The lecturer who is the speaker may conduct a lecture via an acoustic device including a microphone and a speaker, or conduct a lecture without an acoustic device.

Even when the user using the electronic device 1000 and the lecturer are in the same indoor space, the farther the user and the lecturer are from each other, the more the lecturer's voice is influenced by the indoor space before reaching the user's electronic device 1000. Furthermore, even in the same space, an audio input including a voice obtained from the electronic device 1000 may vary depending on situations such as, for example, the existence of objects or people located in the space, or whether a window is opened or closed.

Hereinafter, a method, performed by the electronic device 1000 on the listener's side, of improving audio quality so that the speaker's voice is well heard by obtaining an audio input including the speaker's voice transmitted in the form of sound waves and removing noise caused by a reverberation or artificially generated sound will be described in detail.

Figure 2:
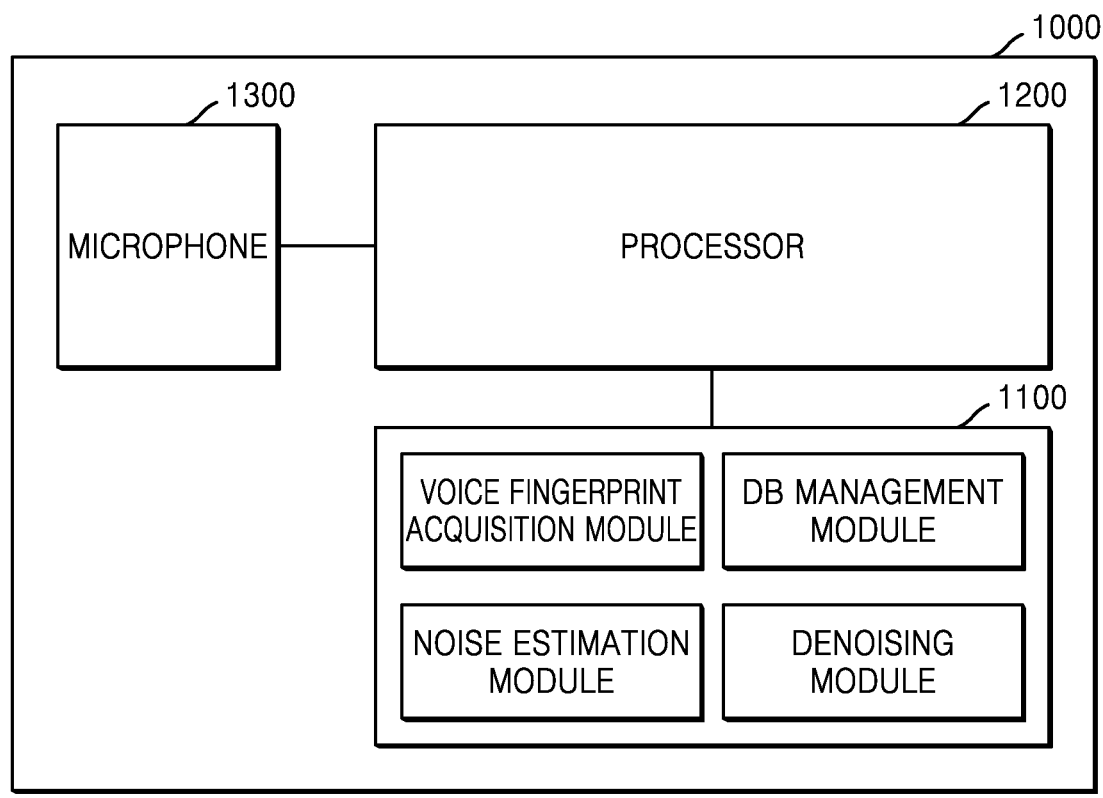
FIG. 2 is a block diagram of a configuration of an electronic device according to an embodiment of the disclosure.

FIG. 2 is a block diagram of a configuration of an electronic device 1000 according to an embodiment of the disclosure.

Referring to FIG. 2, the electronic device 1000 may include a memory 1100, a processor 1200, and a microphone 1300. In addition, the electronic device 1000 may further include components such as a power supply for supplying power to the electronic device 1000, and those of ordinary skill in the art related to embodiments of the disclosure would understand that the electronic device 1000 may further include other components in addition to the components shown in FIG. 2.

The memory 1100 may store instructions executable by the processor 1200. The memory 1100 may store a program including instructions. The memory 1100 may include, for example, at least one type of hardware device from among random access memory (RAM), static RAM (SRAM), read-only memory (ROM), flash memory, electrically erasable programmable ROM (EEPROM), PROM, a magnetic memory, a magnetic disk, and an optical disk, but is not limited thereto.

The memory 1100 may store at least one software module including instructions. Each software module is executed by the processor 1200 to cause the electronic device 1000 to perform an operation or function. For example, as shown in FIG. 2, a voice fingerprint acquisition module, a database (DB) management module, a noise estimation module, and a denoising module may be executed by the processor 1200, but embodiments are not limited thereto, and the memory 1100 may further include other software modules.

The processor 1200 may control an operation or function performed by the electronic device 1000 by executing instructions or a programmed software module stored in the memory 1100. The processor 1200 may include hardware components that perform arithmetic, logical, and input/output (I/O) operations, and signal processing.

For example, the processor 1200 may include at least one type of hardware device from among a central processing unit (CPU), a microprocessor, a graphics processing unit (GPU), application specific integrated circuits (ASICs), digital signal processors (DSPs), digital signal processing devices (DSPDs), programmable logic devices (PLDs), and field programmable gate arrays (FPGAs), but is not limited thereto.

The microphone 1300 may obtain an audio input including a speaker's voice. The microphone 1300 may obtain an audio input and process the audio input as electrical voice data. When an application is executed by the processor 1200, the microphone 1300 may receive an audio input from the outside.

According to the above configuration, the processor 1200 may execute one or more instructions stored in the memory 1100 to obtain a first voice fingerprint corresponding to the audio input obtained via the microphone 1300 and a second voice fingerprint corresponding to the speaker's voice.

The first voice fingerprint is feature information corresponding to a degraded voice including noise caused by reverberation or artificially generated noise in the process of propagating in the form of sound waves until a speaker's clean voice reaches the electronic device 1000 of a listener. From the speaker's perspective, the first voice fingerprint may be feature information corresponding to noisy far-field audio. The first voice fingerprint is obtained from an audio input received by the electronic device 1000 of the listener.

The second voice fingerprint is feature information corresponding to the speaker's clean voice. From the speaker's perspective, the second voice fingerprint may be feature information corresponding to clean near-field audio. When an audio signal is propagated in the form of a voice watermark via an acoustic device on the speaker's side, the second voice fingerprint may be obtained from an audio signal in the form of a voice watermark detected in the audio input obtained from the electronic device 1000 of the listener. When the acoustic device is not used on the speaker's side, the second voice fingerprint may be obtained using the first voice fingerprint obtained from the electronic device 1000 of the listener.

Although the first and second voice fingerprints are fingerprints corresponding to the same speaker's voice, the first and second voice fingerprints differ from each other in terms of whether each of the first and second voice fingerprints relates to an audio input including noise in the speaker's voice or relates to the speaker's clean voice.

The processor 1200 may execute one or more instructions stored in the memory 1100 to estimate noise caused by an acoustic environment of the audio input based on the first and second voice fingerprints. The processor 1200 may calculate a distance between the first and second voice fingerprints, and when the calculated distance exceeds a preset threshold, determine noise by using a neural network-based model trained to predict an impulse response of the acoustic environment. The distance between the first and second voice fingerprints may be calculated according to a method of calculating a distance between feature vectors. The neural network-based model may receive an input of the first and second voice fingerprints, and output a value corresponding to the estimated noise caused by the acoustic environment.

The processor 1200 may execute one or more instructions stored in the memory 1100 to remove the estimated noise from the audio input obtained from the electronic device 1000. Accordingly, the noise caused by the acoustic environment may be removed from the audio input obtained from the electronic device 1000, and the speaker's voice may be improved, so that an audio quality may be improved. A method of estimating noise by obtaining a voice fingerprint pair according to the disclosure may eliminate the need for a separate process such as registering a speaker's voice sample, and may be applied to changing acoustic environmental conditions.

Operations of the processor 1200 of the electronic device 1000 will now be described in detail with reference to FIG. 3.

Figure 3:
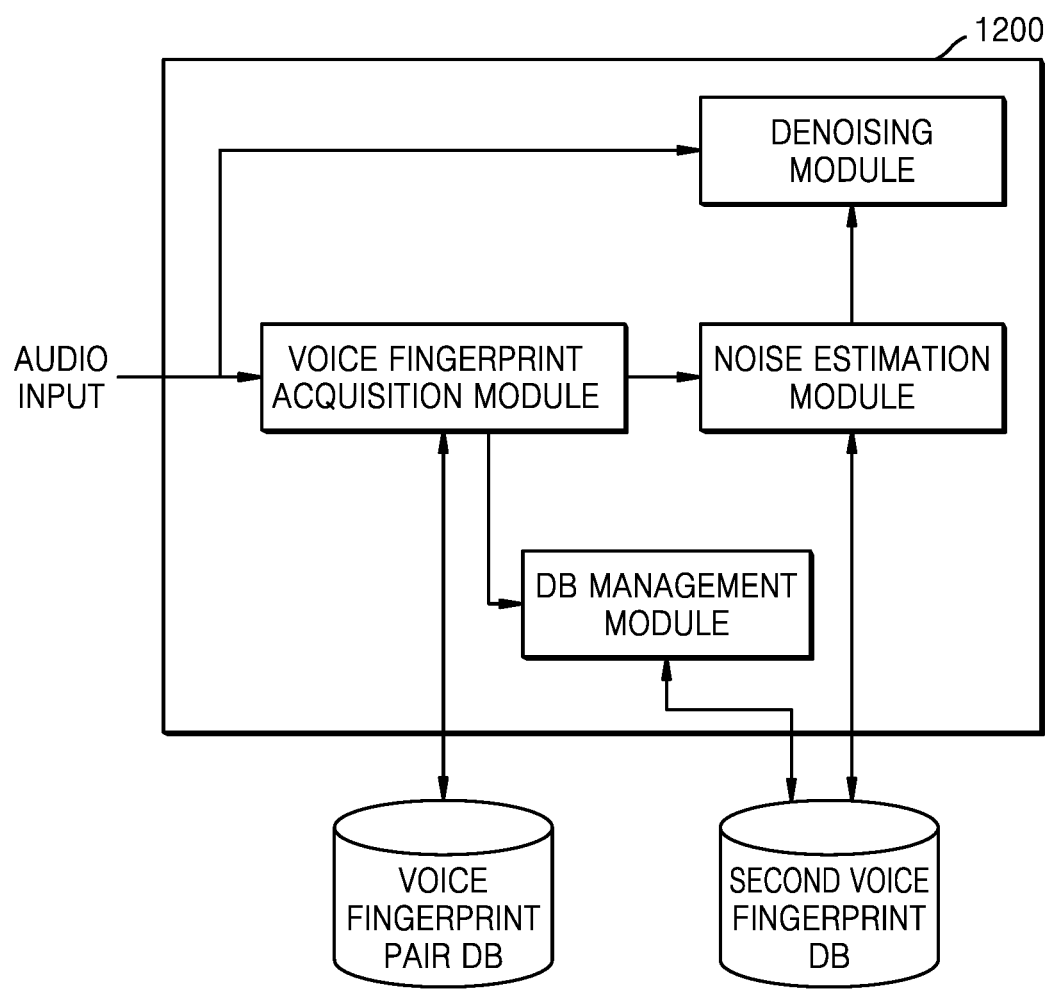
FIG. 3 is a diagram for describing an operation of a processor included in an electronic device according to an embodiment of the disclosure.

FIG. 3 is a diagram for describing operations of the processor 1200.

Referring to FIG. 3, the processor 1200 may fetch and execute the fingerprint acquisition module, the DB management module, the noise estimation module, and the denoising module stored in the memory 1100, and receive an audio input from the microphone 1300. The processor 1200 may perform the following operations to improve a speaker's voice with respect to an audio input including the speaker's voice.

The processor 1200 may obtain first and second voice fingerprints by executing the voice fingerprint acquisition module. The processor 1200 may obtain a first or second voice fingerprint from an audio input including a voice. A voice fingerprint may be represented as a model in which constituent factors are decomposed into a speaker factor and a channel factor, based on a Joint Factor Analysis (JFA) technique. Alternatively, a voice fingerprint may represent various types of factors in a low-dimensional transformation matrix based on an I-vector factor analysis technique. In addition to these factor analysis techniques, various types of speaker voice recognition methods may be used to represent a voice fingerprint.

The first voice fingerprint may be obtained based on an audio input obtained from the electronic device 1000. Because the audio input obtained from the electronic device 1000 includes noise together with the speaker's voice, the first voice fingerprint is a voice fingerprint corresponding to a degraded voice.

The second voice fingerprint may be obtained in different ways depending on whether the second voice fingerprint is propagated together with a speaker's voice by using an acoustic device that is used on the speaker's side to transmit the voice.

For example, when an acoustic device is not used on the speaker's side, or a voice fingerprint corresponding to a speaker's clean voice is not propagated via the acoustic device, the processor 1200 may execute the voice fingerprint acquisition module to obtain a first voice fingerprint corresponding to the obtained audio input, and a second voice fingerprint based on the first voice fingerprint. The processor 1200 may execute the voice fingerprint acquisition module to perform smoothing filtration on the first voice fingerprint, and estimate the second voice fingerprint based on the first voice fingerprint that has undergone the smoothing filtration.

To estimate the second voice fingerprint, the processor 1200 may use a DB (hereinafter, referred to as a voice fingerprint pair DB) which stores voice fingerprint pairs, each pair corresponding to a first audio sample and a second audio sample obtained by degrading the quality of the first audio sample. In order to degrade the quality of the first audio sample, audio mixing may be performed to mix noise with the first audio sample, or a convolution operation with a room impulse response may be performed on the first audio sample. The voice fingerprint pair DB may store a voice fingerprint pair in which a clean voice fingerprint corresponding to the first audio sample is matched with a degraded voice fingerprint corresponding to the second audio sample obtained by degrading the quality of the first audio sample.

The processor 1200 may execute the voice fingerprint acquisition module to determine a degraded voice fingerprint that is most similar to the first voice fingerprint that has undergone the smoothing filtration from the voice fingerprint pair DB that stores voice fingerprint pairs corresponding to the first and second audio samples. In this case, various modified algorithms including a nearest neighbor algorithm may be used. The processor 1200 may determine, as the second voice fingerprint, a clean voice fingerprint in a voice fingerprint pair corresponding to the determined degraded voice fingerprint.

As another example, when a second voice fingerprint is propagated together with a voice via the acoustic device that is used on the speaker's side to transmit the voice, the processor 1200 of the electronic device 1000 may execute the voice fingerprint obtaining module to detect an audio signal embedded in the form of an audio watermark in an audio input obtained via the microphone 1300. The processor 1200 may decode the detected audio signal. The acoustic device on the speaker's side and the electronic device 1000 on the listener's side may configure a mutually compatible acoustic system by sharing in advance information about methods of encoding and decoding the second voice fingerprint.

To generate the second voice fingerprint, the acoustic device on the speaker's side may obtain the speaker's voice, and detect an audio segment without noise in the obtained speaker's voice. The acoustic device may obtain the second voice fingerprint for the clean audio segment without noise. The acoustic device may encode the second voice fingerprint and embed the encoded second voice fingerprint in the speaker's voice in the form of a voice watermark. The encoded second voice fingerprint embedded in the voice in the form of the voice watermark is inaudible to humans but includes information about the second voice fingerprint. The acoustic device may broadcast the speaker's voice together with the second voice fingerprint embedded in the form of the voice watermark.

As another example, when the electronic device 1000 is capable of obtaining the second voice fingerprint according to the above-described two methods, the processor 1200 may execute the voice fingerprint acquisition module to first determine whether a voice watermark is detected in an audio input obtained from the electronic device 100. When it is determined that the voice watermark is detected, the processor 1200 may extract and decode an audio signal embedded in the form of the voice watermark to thereby obtain a second voice fingerprint. When it is determined that the voice watermark is not detected, the processor 1200 may obtain a first voice fingerprint from the audio input, and a second voice fingerprint estimated based on the obtained first voice fingerprint.

The first and second voice fingerprints obtained by the voice fingerprint acquisition module may be input to the noise estimation module. In addition, the DB management module may obtain the second voice fingerprint from the voice fingerprint acquisition module and manage a second voice fingerprint DB. The noise estimation module may retrieve a second voice fingerprint from the second voice fingerprint DB.

The processor 1200 may execute the DB management module to update the second voice fingerprint DB based on the obtained second voice fingerprint.

The processor 1200 may execute the DB management module to determine, based on a second voice fingerprint obtained via the voice fingerprint acquisition module, a previous second voice fingerprint stored in the second voice fingerprint DB, and a first voice fingerprint that has undergone smoothing filtration, whether voice enhancement performance is improved by using the obtained second voice fingerprint. The processor 1200 may calculate a first voice enhancement performance corresponding to an obtained second voice fingerprint, based on the obtained second voice fingerprint and the first voice fingerprint that has undergone smoothing filtration. The processor 1200 may calculate a second voice enhancement performance corresponding to the previous second voice fingerprint, based on the previous second voice fingerprint and the first voice fingerprint that has undergone the smoothing filtration. The processor 1200 may compare the first voice enhancement performance with the second voice enhancement performance to determine whether the voice enhancement performance is improved.

When it is determined that the voice enhancement performance is improved, the processor 1200 may update the previous second voice fingerprint to the obtained second voice fingerprint, and when it is determined that the voice enhancement performance is not improved, maintain the previous second voice fingerprint.

The processor 1200 may execute the noise estimation module to calculate a distance between the first and second voice fingerprints, and when the calculated distance exceeds a preset threshold, determine noise by using a neural network-based model. A neural network-based model may be trained to predict an impulse response of an acoustic environment. The neural network-based model may receive an input of the first and second voice fingerprints, and output a value corresponding to noise caused by the acoustic environment.

The processor 1200 may execute the denoising module to remove estimated noise from the audio input obtained from the electronic device 1000. By removing the noise corresponding to the acoustic environment from the audio input obtained from the electronic device 1000, the speaker's voice may be heard more loudly than in the original audio input, and the speaker's voice may sound as if the speaker's voice is relatively improved.

Figure 4:
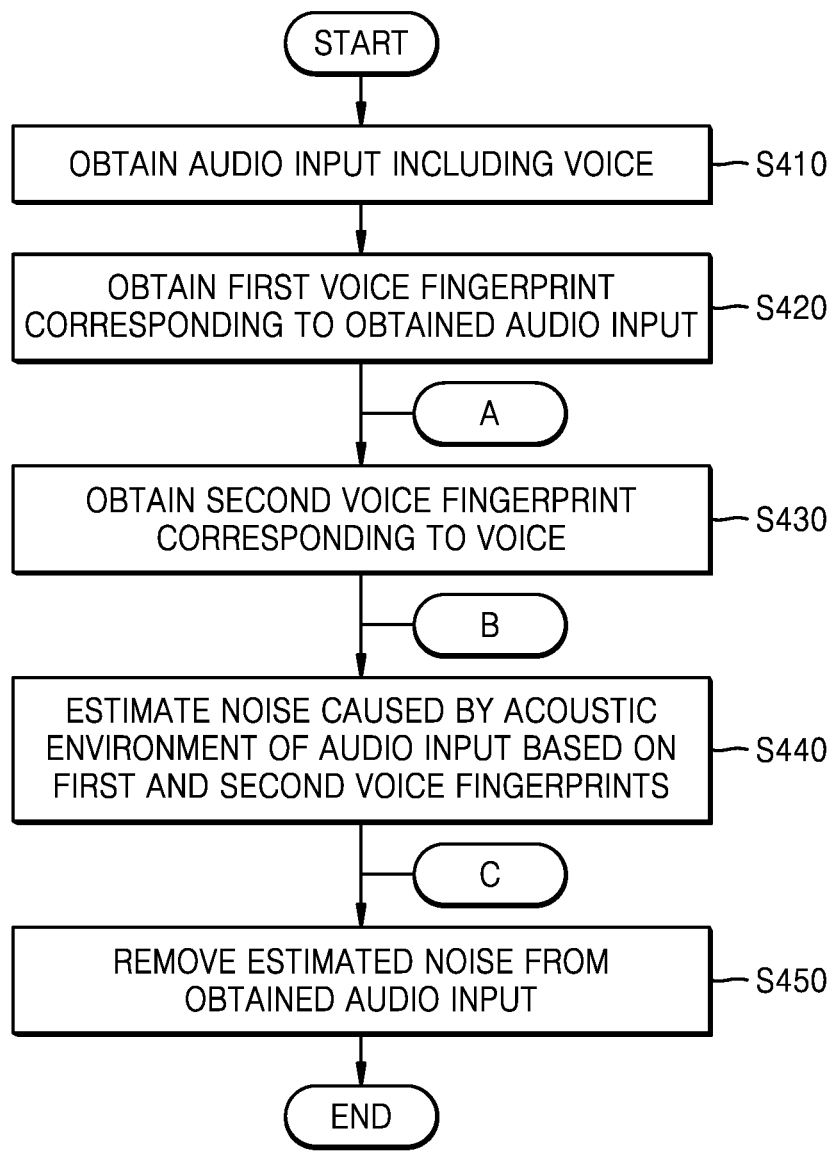
FIG. 4 is a flowchart of a method of improving audio quality according to an embodiment of the disclosure.

FIG. 4 is a flowchart of a method of improving audio quality according to an embodiment of the disclosure. Hereinafter, although omitted, the above description of the electronic device 1000 for improving audio quality may also be applied to a method for improving audio quality.

The electronic device 1000 obtains an audio input including a voice. (operation S410). The audio input obtained by the electronic device 1000 may include noise caused by a reverberation or artificially generated sound.

The electronic device 1000 obtains a first voice fingerprint corresponding to the obtained audio input (operation S420). The first voice fingerprint is feature information corresponding to a voice having a sound quality degraded due to noise, and may be obtained based on the obtained audio input.

The electronic device 1000 may obtain a second voice fingerprint corresponding to the speaker's voice (operation S430). The second voice fingerprint is feature information corresponding to a speaker's clean voice. Various examples of a process of obtaining the second voice fingerprint will be described with reference to FIGS. 5 through 7.

Figure 5:
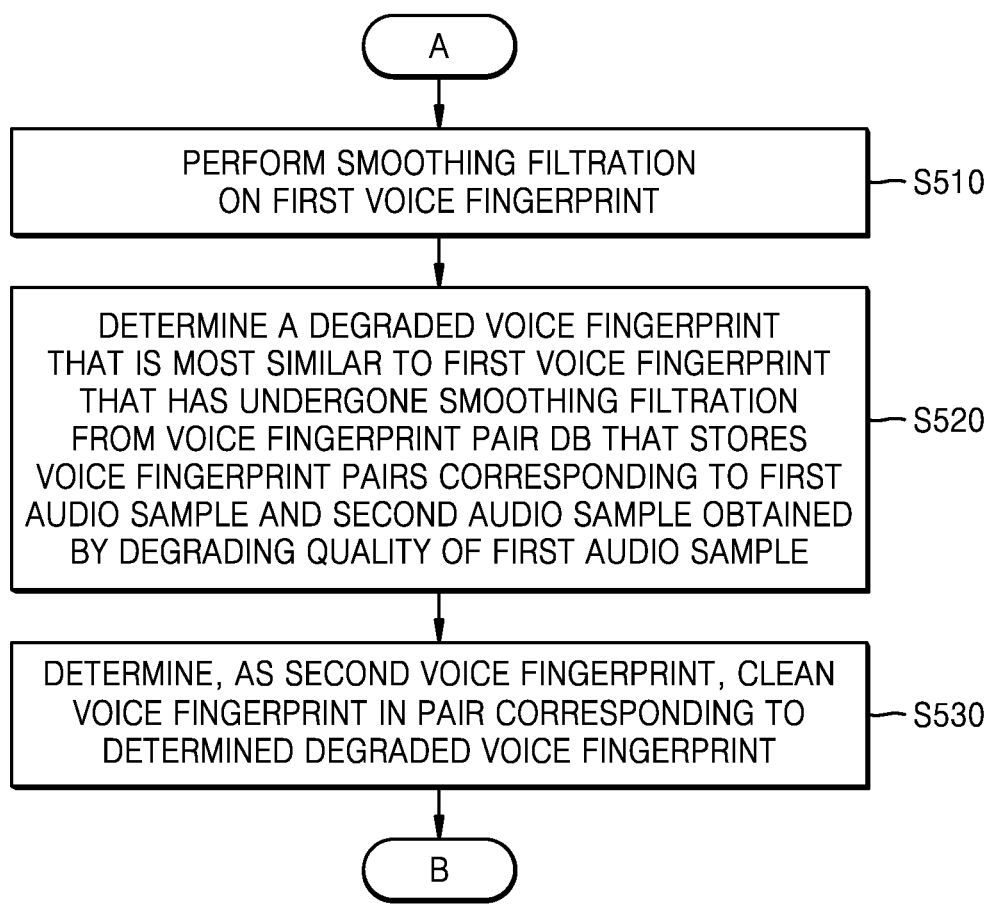
FIG. 5 is a detailed flowchart for describing an example of a process of obtaining a second voice fingerprint according to an embodiment of the disclosure.

FIG. 5 is a detailed flowchart for describing an example of a process of obtaining a second voice fingerprint. The example of FIG. 5 illustrates a process by which the electronic device 1000 estimates a second voice fingerprint from an audio input when an acoustic device is not used on a speaker's side, or a voice fingerprint corresponding to a speaker's clean voice is not propagated via the electronic device 1000.

The electronic device 1000 may perform smoothing filtration on a first voice fingerprint obtained based on the audio input (operation S510).

The electronic device 1000 may determine a degraded voice fingerprint that is most similar to the first voice fingerprint that has undergone smoothing filtration from the voice fingerprint pair DB that stores voice fingerprint pairs, each pair corresponding to a first audio sample and a second audio sample obtained by degrading the quality of the first audio sample (operation S520). For example, the electronic device 1000 may determine the degraded voice fingerprint that is most similar to the first voice fingerprint among second audio samples of the voice fingerprint pairs stored in the voice fingerprint pair DB.

The electronic device 1000 may determine, as a second voice fingerprint, a clean voice fingerprint (that is, a first audio sample) in a voice fingerprint pair corresponding to the determined degraded voice fingerprint (that is, a second audio sample) (operation S530). The electronic device 1000 may obtain a clean voice fingerprint matched with the degraded voice fingerprint by using the voice fingerprint pair DB.

Figure 6:
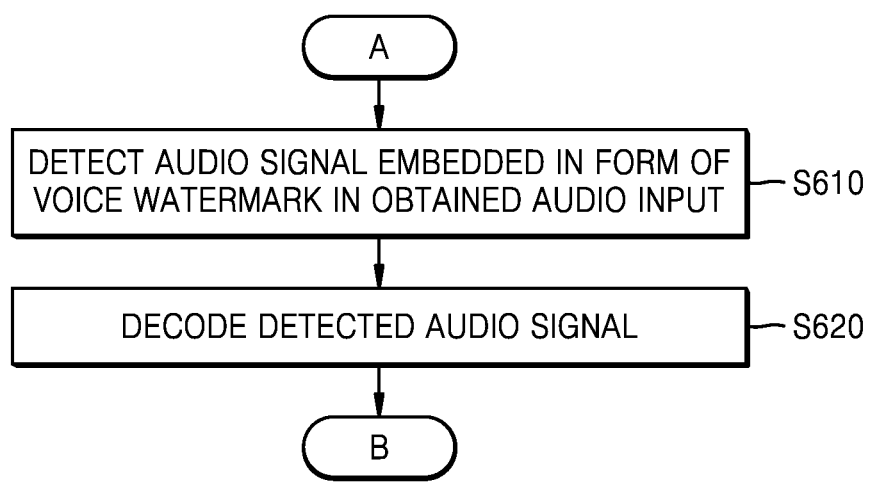
FIG. 6 is a detailed flowchart for describing an example of a process of obtaining a second voice fingerprint according to an embodiment of the disclosure.

FIG. 6 is a detailed flowchart for describing another example of a process of obtaining a second voice fingerprint. The example of FIG. 6 illustrates a process by which the electronic device 1000 detects a second voice fingerprint in an audio input when the second voice fingerprint is propagated together with a voice via an acoustic device that is used on the speaker's side to transmit the voice.

The electronic device 1000 may detect, in an obtained audio input, an audio signal embedded in the form of a voice watermark (operation S610). To achieve this, the acoustic device on the speaker's side may obtain a second voice fingerprint for a clean audio segment in the speaker's voice, encode the second voice fingerprint to embed the encoded second voice fingerprint in the speaker's voice in the form of a voice watermark, and broadcast the second voice fingerprint embedded in the speaker's voice.

The electronic device 1000 may decode the detected audio signal (operation S620). The electronic device 1000 may detect the encoded second voice fingerprint embedded in the form of a voice watermark and decodes the encoded second voice fingerprint to obtain the second voice fingerprint.

Figure 7:
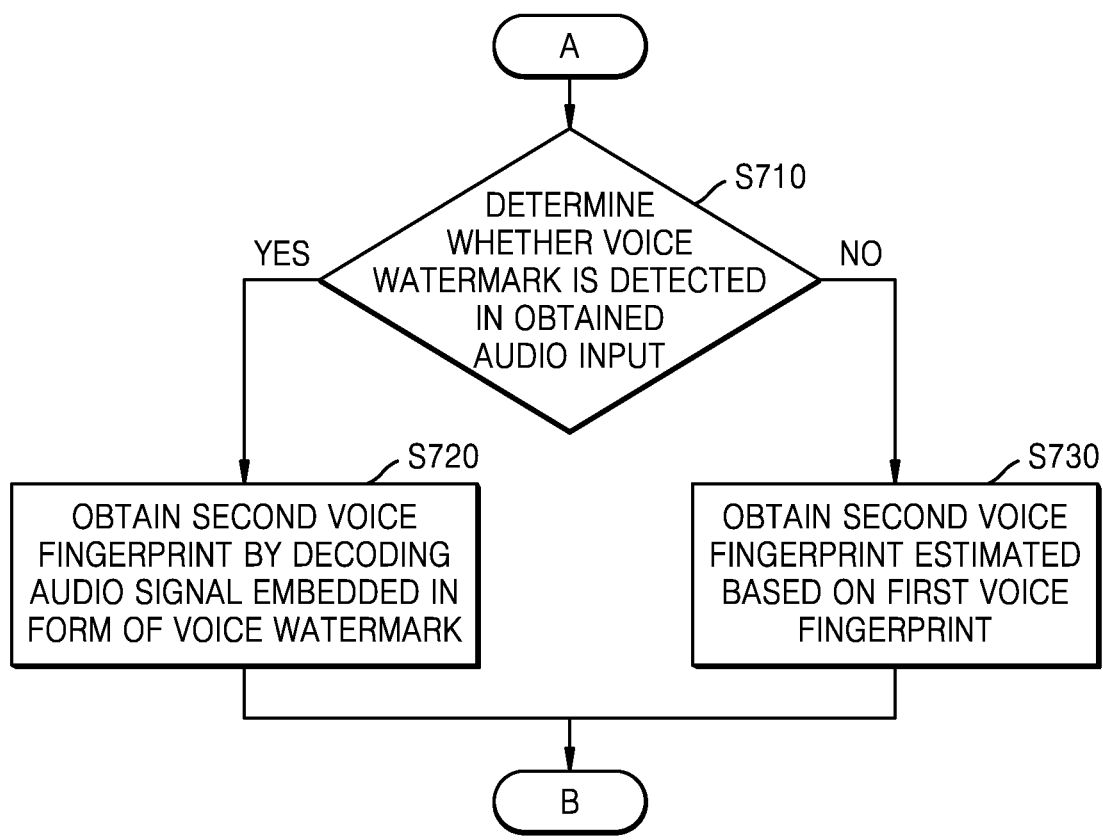
FIG. 7 is a detailed flowchart for describing an example of a process of obtaining a second voice fingerprint according to an embodiment of the disclosure.

FIG. 7 is a detailed flowchart for describing another example of a process of obtaining a second voice fingerprint.

The electronic device 1000 may determine whether a voice watermark is detected in an obtained audio input (operation S710). The electronic device 1000 may check first whether a second voice fingerprint transmitted by an acoustic device on a speaker's side is included in the obtained audio input by determining whether the voice watermark is detected in the audio input.

When it is determined that the voice watermark is detected, the electronic device 1000 may obtain the second voice fingerprint by decoding an audio signal embedded in the form of the voice watermark (operation S720). Detailed descriptions thereof are already provided above with reference to FIG. 6, and thus, will not be repeated below.

When it is determined that the voice watermark is not detected, the electronic device 1000 may obtain a second voice fingerprint estimated based on the first voice fingerprint (operation S730). Detailed descriptions thereof are already provided above with reference to FIG. 5, and thus, will not be repeated below.

In addition, a process of updating a second voice fingerprint after obtaining the second voice fingerprint will be described with reference to FIG. 8.

Figure 8:
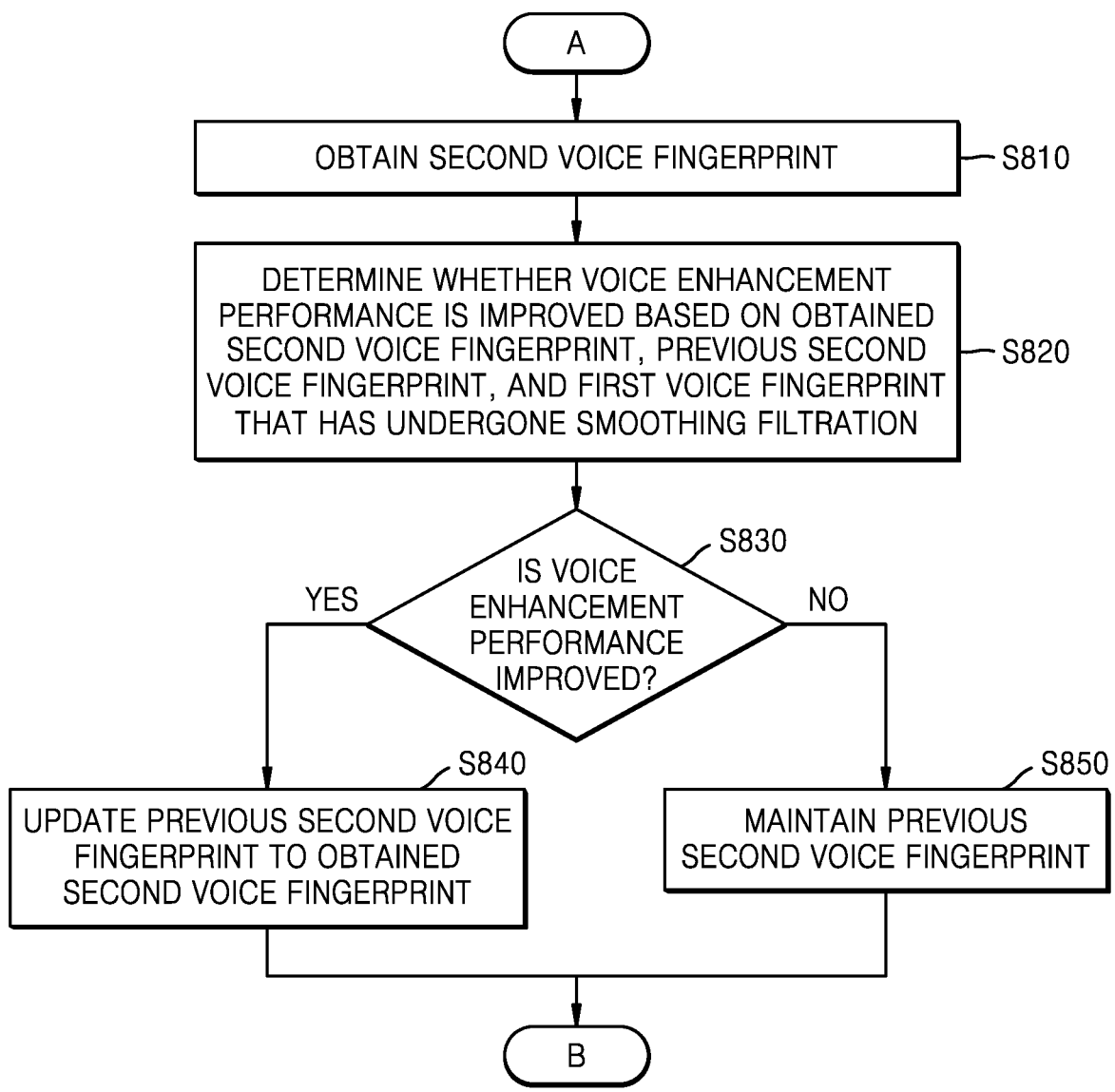
FIG. 8 is a detailed flowchart for describing an example of a process of updating a second voice fingerprint after obtaining the second voice fingerprint according to an embodiment of the disclosure.

FIG. 8 is a detailed flowchart for describing an example of a process of updating a second voice fingerprint after obtaining a new second voice fingerprint.

The electronic device 1000 may obtain a second voice fingerprint from an audio input (operation S810). The descriptions provided above with reference to FIGS. 5 through 7 may be applied to a process of obtaining the second voice fingerprint.

The electronic device 1000 may determine whether voice enhancement performance is improved by using the obtained second voice fingerprint (operation S820), based on the currently obtained second voice fingerprint, a previous second voice fingerprint stored in the second voice fingerprint DB, and a first voice fingerprint that has undergone smoothing filtration. The electronic device 1000 may calculate, based on the obtained second voice fingerprint and the first voice fingerprint that has undergone the smoothing filtration, a first voice enhancement performance corresponding to the obtained second voice fingerprint. The electronic device 1000 may calculate a second voice enhancement performance corresponding to the previous second voice fingerprint, based on the previous second voice fingerprint and the first voice fingerprint that has undergone the smoothing filtration. The electronic device 1000 may compare the first voice enhancement performance with the second voice enhancement performance.

The electronic device 1000 may determine whether the voice enhancement performance is improved based on a result of comparison (operation S830). The electronic device 1000 may determine whether the voice enhancement performance is improved when using the newly obtained second voice fingerprint compared to when using the previous second voice fingerprint.

When the voice enhancement performance is improved, the electronic device 1000 may update the previous second voice fingerprint in the second voice fingerprint DB to the currently obtained second voice fingerprint (operation S840). The electronic device 1000 may dynamically update, according to the voice enhancement performance, the second voice fingerprint DB with the newly obtained second voice fingerprint. The second voice fingerprint DB is used to provide the second voice fingerprint, based on which the noise estimation module estimates noise caused by an acoustic environment of an audio input.

When the voice enhancement performance is not improved, the electronic device 1000 may maintain the previous second voice fingerprint in the second voice fingerprint DB (operation S850).

Referring back to FIG. 4, the electronic device 1000 may estimate noise caused by an acoustic environment of an audio input based on the first and second voice fingerprints (operation S440). This operation will now be described in more detail with reference to FIG. 9.

Figure 9:
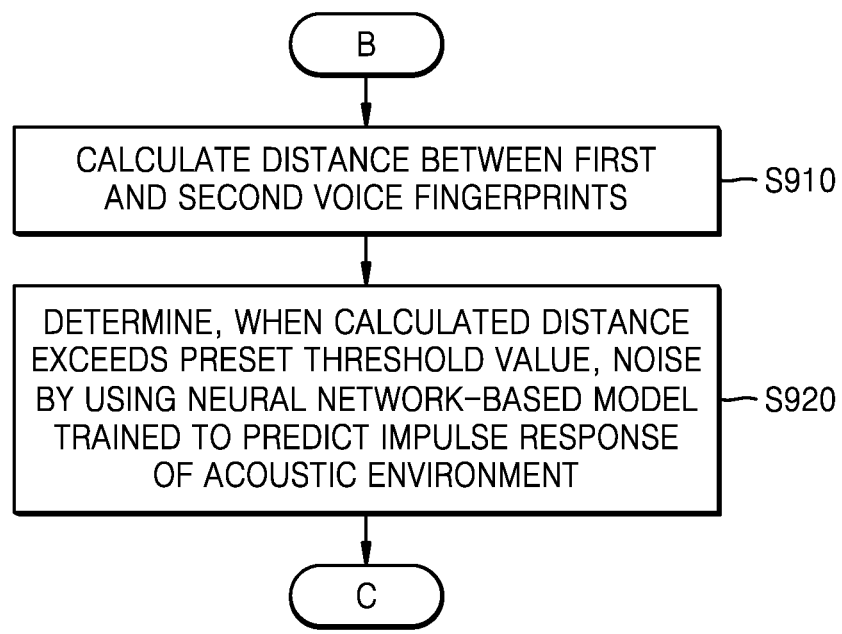
FIG. 9 is a detailed flowchart for describing an example of estimating noise caused by an acoustic environment of an audio input according to an embodiment of the disclosure.

FIG. 9 is a detailed flowchart for describing an example of estimating noise caused by an acoustic environment of an audio input.

The electronic device 1000 may calculate a distance between the first and second voice fingerprints (operation S910). The distance between the first and second voice fingerprints may be calculated according to a method of calculating a distance between feature vectors. The electronic device 1000 may determine, based on the distance between the first and second voice fingerprints, whether to remove noise caused by the acoustic environment of the audio input.

When the calculated distance exceeds a preset threshold, the electronic device 1000 may determine noise by using a neural network-based model trained to predict an impulse response of the acoustic environment (operation S920). The neural network-based model may receive an input of the first and second voice fingerprints, and output a value corresponding to the noise caused by the acoustic environment. The electronic device 1000 may estimate the influence of the acoustic environment of the audio input based on a pair of voice fingerprints.

Referring back to FIG. 4, the electronic device 1000 may remove the estimated noise from the obtained audio input (operation S450). The noise caused by the acoustic environment may be removed from the audio input, which is obtained from the electronic device 1000, and the speaker's voice may be improved, so that an audio quality may be improved.

Figure 10:
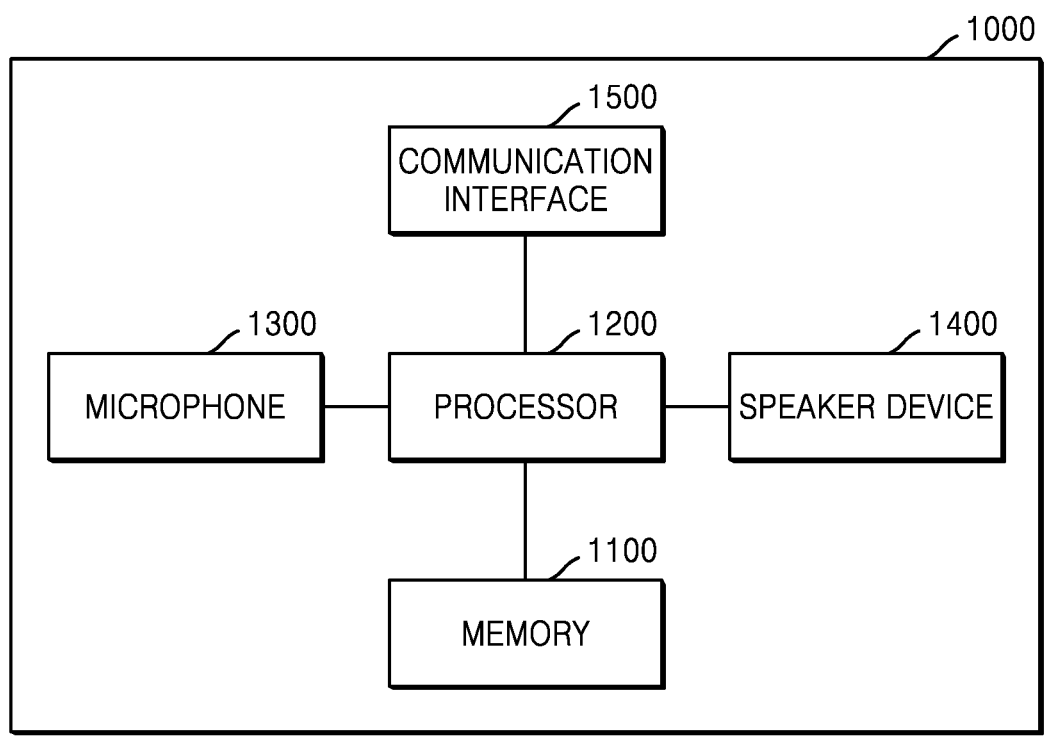
FIG. 10 is a block diagram of a configuration of an electronic device according to an embodiment of the disclosure.

FIG. 10 is a block diagram of a configuration of an electronic device 1000 according to another embodiment of the disclosure.

Referring to FIG. 10, the electronic device 1000 according to an embodiment of the disclosure may include a memory 1100, a processor 1200, a microphone 1300, a speaker device 1400, and a communication interface 1500. Descriptions of the terms and contents which are already provided above with respect to FIG. 2 will be omitted below.

The memory 1100 may store programs for processing and controlling by the processor 1200 and data input to or output from the electronic device 1000. The memory 1100 may store computer executable instructions. Programs stored in the memory 1100 may be classified into a plurality of modules according to their functions.

The processor 1200 typically controls all operations of the electronic device 1000. For example, the processor 1200 may control all operations of the microphone 1300, the speaker device 1400, the communication interface 1500, etc. by executing programs stored in the memory 1100. The processor 1200 may include at least one processing module.

The microphone 1300 obtains an audio input from the outside and processes the audio input as electrical voice data. For example, the microphone 1300 may obtain an audio input including a voice from a speaker or an external device. Noise may be removed from the audio input obtained via the microphone 1300 by using various noise removal algorithms.

The speaker device 1400 outputs an audio input obtained via the microphone 1300 or received from the communication interface 1500, or audio data stored in the memory 1100.

The communication interface 1500 may be connected to a device located outside the electronic device 1000 to transmit an audio input obtained from the electronic device 1000 to the device located outside or to receive an audio input from the device. The communication interface 1500 may communicate with other devices or networks.

The communication interface 1500 may include one or more components that enable the electronic device 1000 to communicate with another device and a server. For example, the communication interface 1500 may include a short-range communication unit or a mobile communication unit.

The short-range wireless communication unit may include at least one of a Bluetooth communication unit, a Bluetooth Low Energy (BLE) communication unit, a Near Field Communication (NFC) unit, a wireless local area network (WLAN) (or Wi-Fi) communication unit, a Zigbee communication unit, an Infrared Data Association (IrDA) communication unit, a Wi-Fi Direct (WFD) communication unit, or an ultra-wideband (UWB) communication unit, but is not limited thereto. The mobile communication unit transmits or receives radio signals to or from at least one of a base station, an external terminal, or a server on a mobile communication network.

Although not shown in FIG. 10, the electronic device 1000 may further include a user input interface and an output interface. The user input interface refers to a means via which a user inputs data for controlling the electronic device 1000. The user input interface may be a keypad, a touch panel, a pen recognition panel, etc. The output interface may output a result of executing an application on the electronic device 1000. The output interface may output a result of an operation of the electronic device 1000, and when there is a user input, output a result that is changed according to the user input. For example, the output interface may display an execution screen for a recording application or a user interface for receiving manipulations by a user.

According to the above configuration, the electronic device 1000 for improving audio quality may be used in the following usage scenarios.

According to an example of a usage scenario, a user may run a phone call application on the electronic device 1000 to make a phone call with a smartphone while working. The user may be away from the electronic device 1000 by a certain distance while making a phone call by using a speaker phone function of the electronic device 1000 (e.g., the electronic device 1000 is a smart phone, which is placed at a distance greater than a distance permitted by the smartphone during normal use). For example, the user may make a phone call using the smartphone placed on a desk while typing on a laptop computer. In such a situation, the other party of the phone call may not be able to hear a user's voice clearly because the user's voice reverberates or sounds faint. In this case, when the user's smartphone corresponds to the electronic device 1000 for improving audio quality according to the disclosure, the electronic device 1000 may remove noise based on a user's voice fingerprint pair, enhance the voice, and transmit a clear and non-reverberant voice to the other party of the phone call.

According to another example of the usage scenario, the user may run a video recording application on the electronic device 1000 to record his/her own videos in a noisy environment (e.g., a congested and crowded environment). When a video is recorded using the electronic device 1000 for improving audio quality according to the disclosure, other people's voices may be removed from the video. The electronic device 1000 may obtain a voice fingerprint pair for each speaker's voice recorded in the video, classify each speaker's voice based on a corresponding voice fingerprint pair, and tag identifier information such as each speaker's ID to the corresponding voice fingerprint pair. The user may determine which voices are to be left in the video and which voices are to be removed along with other noise, thereby creating a video in which only a desired voice is enhanced.

According to another example of the usage scenario, the user may run a teleconference application on the electronic device 1000 to conduct a teleconference. The electronic device 1000 may obtain a voice fingerprint pair for each speaker participating in the teleconference, and classify each speaker's voice based on the corresponding voice fingerprint pair. Each speaker's voice may be enhanced in the teleconference by removing noise from the speaker's voice based on the corresponding voice fingerprint pair.

A method of improving audio quality, which is described with reference to example embodiments of the disclosure, may be implemented using a hardware component, a software component, and/or a combination of the hardware component and the software component. For example, the method of improving audio quality, which is described in the embodiments of the disclosure may be implemented using one or more general- or special-purpose computers, such as processors, arithmetic logic units (ALUs), ASICs, DSPs, DSPDs, PLDs, microcomputers, microprocessors, or any other device capable of executing and responding to instructions.

Software may include a computer program, a piece of code, an instruction, or a combination of one or more thereof, to independently or collectively instruct or configure a processing device to operate as desired.

The software may be implemented as a computer program including instructions stored in computer-readable storage media. Examples of the computer-readable recording media include magnetic storage media (e.g., ROM, RAM, floppy disks, hard disks, etc.), optical recording media (e.g., compact disc ROM (CD-ROMs) and digital versatile discs (DVDs, etc.), etc. The computer-readable recording media may be distributed over computer systems connected through a network so that computer-readable code may be stored and executed in a distributed manner. The media may be read by a computer, stored in a memory, and executed by a processor.

A computer may refer to a device configured to retrieve an instruction from a storage medium and to operate in response to the retrieved instruction according to embodiments of the disclosure and may include the electronic device 1000 according to the embodiments of the disclosure.

A computer-readable storage medium may be provided in the form of a non-transitory storage medium. In this regard, the term 'non-transitory' only means that the storage medium does not include a signal only and is a tangible device, and the term does not differentiate between where data is semi-permanently stored in the storage medium and where the data is temporarily stored in the storage medium.

Furthermore, methods according to embodiments of the disclosure may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of the electronic device 1000 or through an electronic market (e.g., App Store). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system including a server and a terminal (e.g., the electronic device 1000), the computer program product may include a storage medium of the server or a storage medium of the terminal. Alternatively, in a case where there is a third device communicatively connected to the server or terminal, the computer program product may include a storage medium of the third device. Alternatively, the computer program product may include a software program itself that is transmitted from the server to the terminal or third device or that is transmitted from the third device to the terminal.

In this case, one of the server, the terminal, and the third device may execute the computer program product to perform methods according to embodiments of the disclosure. Alternatively, at least two of the server, the terminal, and the third device may execute the computer program product to perform the methods according to the embodiments of the disclosure in a distributed manner.

For example, the server (e.g., a cloud server or AI server) may execute the computer program product stored therein to control the terminal communicatively connected to the server to perform the methods according to the embodiments of the disclosure.

As another example, the third device may execute the computer program product to control the terminal communicatively connected to the third device to perform the methods according to the embodiments of the disclosure.

In a case where the third device executes the computer program product, the third device may download the computer program product from the server, and execute the downloaded computer program product. Alternatively, the third device may execute the computer program product that is pre-loaded therein to perform the methods according to the embodiments of the disclosure.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While embodiments of the disclosure have been described with reference to the figures, it will be understood by those of ordinary skill in the art that various modifications and changes in form and details may be made from the above descriptions. For example, adequate effects may be achieved even when the above-described techniques are performed in a different order than that described above, and/or the aforementioned components such as electronic devices, structures, circuits, etc. are combined or coupled in different forms than those described above or are replaced or substituted with other components or their equivalents.

The invention claimed is:

1. A method of improving a quality of an audio, the method being performed by an electronic device and comprising:
obtaining an audio input including a voice;
obtaining a first voice fingerprint corresponding to the obtained audio input;
obtaining a second voice fingerprint corresponding to the voice;
estimating, based on the first voice fingerprint and the second voice fingerprint, noise caused by an acoustic environment of the obtained audio input, using a neural network-based model, wherein the neural network-based model is configured to receive an input of the first voice fingerprint and the second voice fingerprint, and output a value corresponding to the noise caused by the acoustic environment; and
removing the estimated noise from the obtained audio input,
wherein the estimating the noise comprises:
obtaining a distance between the first voice fingerprint and the second voice fingerprint; and
based on the obtained distance exceeding a preset threshold, estimating the noise by using the neural network-based model that is trained to predict an impulse response of the acoustic environment.

2. The method of claim 1, wherein
the obtaining the second voice fingerprint comprises:
performing smoothing filtration on the first voice fingerprint; and
estimating the second voice fingerprint based on the first voice fingerprint on which the smoothing filtration has been performed.

3. The method of claim 2, wherein
the estimating the second voice fingerprint comprises:
determining a degraded voice fingerprint that has a highest similarity to the first voice fingerprint on which the smoothing filtration has been performed, among a plurality of voice fingerprint pairs stored in a database, each voice fingerprint pair being a pair of a first audio sample and a second audio sample, the second audio sample being obtained by degrading a quality of the first audio sample; and
determining, as the second voice fingerprint corresponding to the voice, a second voice fingerprint matched to the determined degraded voice fingerprint in a voice fingerprint pair.

4. The method of claim 1, wherein
the obtaining the second voice fingerprint comprises:
detecting, in the obtained audio input, an audio signal embedded in a form of an audio watermark; and
decoding the detected audio signal.

5. The method of claim 1, wherein
the obtaining the second voice fingerprint comprises:
determining whether a voice watermark is detected in the obtained audio input; and
based on determining that the voice watermark is detected, obtaining the second voice fingerprint by decoding an audio signal embedded in a form of the voice watermark, and based on determining that the voice watermark is not detected, obtaining the second voice fingerprint that is estimated based on the first voice fingerprint.

6. The method of claim 1, further comprising:
determining whether a performance of a voice enhancement on the voice is improved with respect to the first voice fingerprint, based on the obtained second voice fingerprint than based on a previous second voice fingerprint; and
based on determining that the performance of the voice enhancement is improved, updating the previous second voice fingerprint to the obtained second voice fingerprint.

7. The method of claim 6, wherein
the determining whether the performance of the voice enhancement is improved comprises:
obtaining a first voice enhancement performance corresponding to the obtained second voice fingerprint, based on the obtained second voice fingerprint and the first voice fingerprint;
obtaining a second voice enhancement performance corresponding to the previous second voice fingerprint, based on the previous second voice fingerprint and the first voice fingerprint; and
comparing the first voice enhancement performance with the second voice enhancement performance.

8. A non-transitory computer-readable recording medium having recorded thereon a program to be executed on at least one processor to cause the at least one processor to perform:
obtaining an audio input including a voice;
obtaining a first voice fingerprint corresponding to the obtained audio input;
obtaining a second voice fingerprint corresponding to the voice;
estimating, based on the first voice fingerprint and the second voice fingerprint, noise caused by an acoustic environment of the obtained audio input, using a neural network-based model, wherein the neural network-based model is configured to receive an input of the first voice fingerprint and the second voice fingerprint, and output a value corresponding to the noise caused by the acoustic environment; and
removing the estimated noise from the obtained audio input,
wherein the estimating the noise comprises:
obtaining a distance between the first voice fingerprint and the second voice fingerprint; and
based on the obtained distance exceeding a preset threshold, estimating the noise by using the neural network-based model that is trained to predict an impulse response of the acoustic environment.

9. An electronic device for improving a quality of an audio, the electronic device comprising:
a microphone configured to obtain an audio input including a voice;
at least one memory configured to store one or more instructions; and
at least one processor configured to execute the one or more instructions to:
obtain a first voice fingerprint corresponding to the obtained audio input; obtain a second voice fingerprint corresponding to the voice; estimate, based on the first voice fingerprint and the second voice fingerprint, noise caused by an acoustic environment of the obtained audio input, using a neural network-based model, wherein the neural network-based model is configured to receive an input of the first voice fingerprint and the second voice fingerprint, and output a value corresponding to the noise caused by the acoustic environment; and remove the estimated noise from the obtained audio input, wherein the at least one processor is further configured to execute the one or more instructions to:

obtain a distance between the first voice fingerprint and second voice fingerprint; and based on the obtained distance exceeding a preset threshold, estimate the noise by using the neural network-based model that is trained to predict an impulse response of the acoustic environment.

10. The electronic device of claim 9, wherein
the at least one processor is further configured to execute the one or more instructions to:
perform smoothing filtration on the first voice fingerprint; and obtain the second voice fingerprint by estimating the second voice fingerprint based on the first voice fingerprint upon which the smoothing filtration has been performed.

11. The electronic device of claim 10, wherein
the at least one processor is further configured to execute the one or more instructions to:
determine a degraded voice fingerprint that is most similar to the first voice fingerprint upon which the smoothing filtration has been performed, among a plurality of voice fingerprint pairs stored in a database, each voice fingerprint pair being a pair of a first audio sample and a second audio sample, the second audio sample being obtained by degrading a quality of the first audio sample; and
determine, as the second voice fingerprint corresponding to the voice, a second voice fingerprint matched to the determined degraded voice fingerprint in a voice fingerprint pair.

12. The electronic device of claim 9, wherein
the at least one processor is further configured to execute the one or more instructions to:
detect, in the obtained audio input, an audio signal embedded in a form of an audio watermark; and
obtain the second voice fingerprint by decoding the detected audio signal.

13. The electronic device of claim 9, wherein
the at least one processor is further configured to execute the one or more instructions to:
determine whether a voice watermark is detected in the obtained audio input; and based on determining that the voice watermark is detected, obtain the second voice fingerprint by decoding an audio signal embedded in a form of the voice watermark, and based on determining that the voice watermark is not detected, obtain the second voice fingerprint that is estimated based on the first voice fingerprint.

14. The electronic device of claim 9, wherein
the at least one processor is further configured to execute the one or more instructions to:
determine whether a performance of a voice enhancement with respect to the first voice fingerprint is improved, based on the obtained second voice fingerprint than based on a previous second voice fingerprint; and
based on determining that the performance of the voice enhancement is improved, update the previous second voice fingerprint to the obtained second voice fingerprint.

15. The electronic device of claim 14, wherein
the at least one processor is further configured to execute the one or more instructions to:
obtain a first voice enhancement performance corresponding to the obtained second voice fingerprint, based on the obtained second voice fingerprint and the first voice fingerprint;
obtain a second voice enhancement performance corresponding to the previous second voice fingerprint, based on the previous second voice fingerprint and the first voice fingerprint; and
compare the first voice enhancement performance with the second voice enhancement performance.

16. The electronic device of claim 9, wherein
the at least one processor is further configured to execute the one or more instructions to, based on voices of a plurality of speakers being included in the obtained audio input:
obtain, for a voice of each speaker of the plurality of speakers, a voice fingerprint pair including the first voice fingerprint and the second voice fingerprint; and
tag identifier information of a corresponding speaker to a voice fingerprint pair of the corresponding speaker.

* * * * *